United States Patent Office 3,351,476
Patented Nov. 7, 1967

3,351,476
CHEMICALLY BONDED REFRACTORY SHAPES
Ernest P. Weaver and Ben Davies, Pittsburgh, Pa., assignors to Harbison-Walker Refractories Company, Pittsburgh, Pa.
No Drawing. Filed Mar. 23, 1966, Ser. No. 536,597
10 Claims. (Cl. 106—56)

ABSTRACT OF THE DISCLOSURE

Cold bonded refractory shapes made from a mixture comprised of 100 parts, by weight, of refractory grain and 3 to 8 parts, by weight, of a bonding mixture. The bonding mixture consisting essentially of a mixture of two immiscible liquids, the remainder being a powdered pitch material.

---

This invention relates to cold bonded refractory shapes and more particularly to cold bonded basic refractory shapes.

In certain metallurgical processes, for example, in oxygen steel making which has variously been designated as the L.D. process, oxygen Bessemer, oxygen converter process or "Kaldo" process, the furnace structure is primarily comprised of a metal skin or shell and a refractory lining defining a space for carrying out the process. Generally, the refractory which has the exposed inner surface or "working lining" is made of refractory shapes, such as tar-bonded basic or ceramically-bonded tar impregnated basic shapes.

Tar bonded shapes may be made by mixing size graded refractory aggregate or grains with a tar and forming a desired shape as by molding, pressing, impacting, extruding, piercing-and-forming, and the like. Various kinds of tar or pitch have been proposed, and included have been medium and/or hard pitch, shale tar, asphalt, unsaturated fluid pitch derived from the distillation of extracts of animal and vegetable matter such as lard, tallow, bone fat, garbage and sewage, wool grease, packing house wastes, palm oil, linseed oil, soybean oil, etc. Further background on the medium and hard pitches is set forth in U.S. Patent No. 3,070,449, issued Dec. 25, 1962, and assigned to the assignee of this application.

When using some types of pitch, some difficulty has been encountered. Powdered pitch used for bonding has a melting point in the range of 275° F. to 325° F. which requires heating to obtain the necessary tackiness, plasticity and workability in a brick mix, for instance. In one proposal of the prior art, powdered pitch was mixed with trichloroethylene, but this could be undesirable because of possible chlorine gas.

Briefly, one aspect of the invention is to provide a good quality refractory shape in which size graded, refractory brickmaking batches of refractory grain are cold bonded together with a mixture of powdered pitch, creosote and silicanit (lignin liquor). In some instances, carbon black may be added to produce a gain in bonded strength of the shaped refractory. The mix is formed into shapes and then baked.

It is, accordingly, an object of the present invention to provide improved refractory shapes.

Another object is to provide an improved refractory shape bonded by a mixture of powdered pitch, creosote and lignin liquor.

A further object of the invention is to provide an improved basic refractory shape bonded by a mixture of powdered pitch, creosote and lignin liquor and then baked after forming the desired shape.

Other and further objects will become apparent from the examples given below, which are illustrative of the invention and not presented as limiting the spirit or scope thereof.

Broadly, the invention contemplates bonding refractory grains or aggregates into desired shapes which have sufficient strength for handling, shipping, storage and construction. For the examples given below, basic refractory grain was used, and typical analysis of the material is given to identify the types specified in the examples.

Material identified in the examples as magnesite A has the following analysis (by weight):

| | Percent |
|---|---|
| $SiO_2$ | 0.8–1.0 |
| $Al_2O_3$ | 0.30 |
| $Fe_2O_3$ | 0.30 |
| CaO | 2.4–3.2 |
| MgO | 94–95 |

Material identified as magnesite B has the following typical analysis (by weight):

| | Percent |
|---|---|
| $SiO_2$ | 2.8 |
| $Al_2O_3$ | 0.3 |
| $Fe_2O_3$ | 0.6 |
| CaO | 1.5 |
| MgO | 94.8 |

The preferred basic refractory is a dead burned magnesite or magnesia (MgO) and/or mixtures thereof, typical analysis being set out above. Other types of basic refractories, such as dead burned brucite and other magnesium containing natural ores, chrome ore, etc., have been proposed and are included in one aspect of the invention.

The bonding mixture of the invention includes silicanit (lignin liquor) in a range of from ½ to 2 parts, by weight, 1 to 3½ parts, by weight, of creosote and the remainder being powdered pitch to make up a maximum of about 8 parts, by weight, of the bonding mix per 100 parts of refractory. When more than 2 parts of silicanit are used, the shapes "weep" on baking. This results in extremely fragile bubbles over exposed surfaces of the baked shapes. While the bubbles can be easily removed, it is preferable not to add an extra step in the manufacture of the shapes. More than the upper limit specified of creosote includes too much easily volatilized material in the shape, which may cause cracking on baking. Carbon black may be used in the range of 0 to 1 part, by weight, of the mix. One particular carbon black has been found very effective, and this is sold under the name of Sterling MT–X23, manufactured by Cabot Corporation of Boston, Mass. This is a carbon black of relatively large particle size having a low order of surface activity.

As noted above, hard pitch generally has a softening point within the range of 275–450° F., while medium pitch generally has a softening point in the range 150–250° F. These pitches may be obtained as powder, and as such are easier to use in blending with the refractory grains and the other ingredients of the bonding material. The hard pitch is the preferred form for the mix of this invention.

For making refractory shapes, the bonding ingredients were mixed and then blended with the refractory grains. The mixtures were cold pressed (at about 70° F.) into 9-inch straights (conventionally, rectangular shapes of about 9 x 2½ x 4½ inches). The green brick were baked on flat. To reach baking heat, the temperature was raised at a rate of about 100° F. per hour to 500° F. and held at this temperature for about 3 hours. If one wished, a lower baking temperature can be used, but longer hold times are required. For example, for a final temperature of 350° F., the brick are held for about 16 hours at that temperature. In actual tests, there was little or no change in bulk density or strength of the brick baked at either temperature.

In the following table, the formulation and results of actual tests on brick are given, the forming pressure being about 8000 p.s.i. in all cases:

TABLE 1

| Example | 1 | 2 | 3 | 4 |
|---|---|---|---|---|
| Mix— | Percent | Percent | Percent | Percent |
| Magnesite A: | | | | |
| Coarse (⅜ on 10 mesh) | 30 | 30 | 30 | 30 |
| Intermediate (−10 +28 mesh) | 30 | 30 | 30 | 30 |
| Magnesite B (ball mill fines 35–40% −325 mesh) | 37.5 | 38 | 38 | 38 |
| | Amount in Parts by Weight | | | |
| Creosote | 2 | 2.5 | 2 | 1.5 |
| Powdered Pitch | 3.5 | 3 | 3.5 | 4 |
| Carbon Black (Sterling MT-X23) | | 0.5 | 0.25 | 0 |
| Silicanit | 2 | 1.0 | 1.5 | 2 |
| Bulk Density, p.c.f.: After Baking at 500° F | 179 | 181 | 181 | 178 |
| Modulus of Rupture, p.s.i.: After Baking at 500° F | 1,090 | 850 | 1,250 | 1,290 |
| Appearance After Baking | (*) | (*) | | |

*No cracks.

The table shows each example to have good to excellent strength after baking. Below about 0.5 part of silicanit, cracking occurs on the faces of the brick and the strength is not as high as desired. In the preferred ranges of the bonding mixes given, a good cold bonding results. The amount of the bonding system useful is in the range of from 3 to 8 parts per 100 parts of refractory and preferably from 5½ to 7½. The preferred pitch is hard pitch and is used with from 1½ to 2½ parts of creosote and 1 to 2 parts of the lignin liquor.

The bonding mix provides a good quality cold bond, giving sufficient strength to hold the refractory grains in shape during handling preparatory to the baking procedure. The baking further increases the strength of the brick, without cracking, so that it is satisfactory for shipping and construction in lining furnaces and the like.

The silicanit is but one example of a type of aqueous bond that can be used according to this invention. Many other water-soluble aqueous bonds can also be used such as dextrine, epsom salts, magnesium chloride, chromic acid, chromates such as magnesium chromate, alkaline silicates such as sodium silicate, soluble phosphates and such as phosphoric acid, etc. The basic concept is to provide a bond system for an unburned basic brick which contains a cokable carbonaceous material. This system includes a mixture of two immiscible components; one aqueous and one organic. Upon initial forming and during baking, the water-soluble aqueous bond constituent provides strength to the unburned brick thereby preventing cracking, bloating, slumping, or swelling while the creosote is softening the hard carbon (powdered pitch) by dissolving or liquefying it and allowing it to flow over the grains making up the brick. Almost simultaneously, the creosote is volatilizing away. As heating continues, the liquefied hard carbon or pitch cokes and sets to provide a strong residual bond.

Having thus described the invention in detail and with sufficient particularity as to enable those skilled in the art to practice it, what is desired to have protected by Letters Patent is set forth in the following claims.

We claim:
1. Cold bonded refractory shapes consisting essentially of refractory grain mixed with from 3 to 8 parts, by weight, of a bonding mixture per 100 parts, by weight, of refractory grain and pressed into a desired shape for subsequent baking, said bond mixture consisting of two immiscible liquids; namely, from ½ to 2 parts, by weight, of a water-soluble aqueous heat setting bond, from 1 to 3½ parts, by weight, of creosote, and the remainder of the bonding mix being a powdered pitch.

2. Cold bonded refractory shapes according to claim 1 wherein said refractory grain are basic refractory grain.

3. Cold bonded refractory shapes according to claim 1 wherein said powdered pitch is powdered hard pitch.

4. Cold bonded refractory shapes according to claim 1 wherein up to about one part of carbon black is added to said bonding mixture.

5. Cold bonded refractory shapes according to claim 1 wherein said bonding mix is present in the range from 5½ to 7½ parts per 100 parts of refractory grain and which includes from 1½ to 2½ parts of creosote and 1 to 2 parts of lignin liquor.

6. Cold bonding refractory shapes according to claim 2 wherein said bonding system is composed of about 1½ parts of creosote, about 2 parts of lignin liquor and about 4 parts of powdered pitch.

7. Cold bonded refractory shapes according to claim 2 wherein said bonding system is composed of about 2½ parts of creosote, about 1 part of lignin liquor, about ½ part of carbon black and about 3 parts of powdered pitch.

8. Cold bonded refractory shapes according to claim 2 wherein said bonding system is composed of about 2 parts of creosote, about 1½ parts of lignin liquor, about ¼ part of carbon black and about 3½ parts of powdered pitch.

9. Cold bonded refractory shapes according to claim 2 wherein said bonding system is composed of about 2 parts of creosote, about 2 parts of lignin liquor, and about 3½ parts of powdered pitch.

10. That method of cold forming tar bonded basic refractory shapes comprising forming a mixture consisting essentially of size graded basic refractory and a bonding complex in the quantity about 3 to 8 parts, by weight, of the bonding system per about 100 parts, by weight, of the refractory, the bonding system consisting essentially of two immiscible liquids; namely, about ½ to 2 parts of lignin liquor, about 1 to 3½ parts of creosote, the remainder of the bonding system being powdered pitch, forming the mixture into shapes without heating.

References Cited

UNITED STATES PATENTS

| 3,168,602 | 2/1965 | Davies et al. | 106—58 |
| 3,233,017 | 2/1966 | Weaver et al. | 106—58 |
| 3,236,664 | 2/1966 | Wilson | 106—58 |

TOBIAS E. LEVOW, *Primary Examiner.*

JAMES E. POER, *Examiner.*